(12) United States Patent
Kim et al.

(10) Patent No.: US 10,168,865 B2
(45) Date of Patent: Jan. 1, 2019

(54) DISPLAY APPARATUS FOR GENERATING SYMBOL AND METHOD THEREOF

(71) Applicant: SAMSUNG ELECTRONICS CO., LTD., Suwon-si (KR)

(72) Inventors: Seok-hyun Kim, Suwon-si (KR); Bong-hyun Cho, Suwon-si (KR); Su-gyeong Hyeon, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 343 days.

(21) Appl. No.: 14/670,761

(22) Filed: Mar. 27, 2015

(65) Prior Publication Data
US 2015/0301702 A1 Oct. 22, 2015

(30) Foreign Application Priority Data
Apr. 21, 2014 (KR) .................. 10-2014-0047283

(51) Int. Cl.
| | |
|---|---|
| G06F 17/30 | (2006.01) |
| G06F 3/0481 | (2013.01) |
| G06F 3/01 | (2006.01) |
| G06F 3/0482 | (2013.01) |
| H04N 5/445 | (2011.01) |
| H04N 21/422 | (2011.01) |
| H04N 21/475 | (2011.01) |
| G06F 3/0488 | (2013.01) |
| H04N 21/431 | (2011.01) |

(52) U.S. Cl.
CPC ........ *G06F 3/0482* (2013.01); *G06F 3/04883* (2013.01); *G06F 17/30247* (2013.01); *H04N 5/44508* (2013.01); *H04N 21/42224* (2013.01); *H04N 21/42226* (2013.01); *H04N 21/4312* (2013.01); *H04N 21/475* (2013.01)

(58) Field of Classification Search
None
See application file for complete search history.

(56) References Cited

U.S. PATENT DOCUMENTS

| | | | | |
|---|---|---|---|---|
| 5,545,857 A | * | 8/1996 | Lee ........................ | G06F 3/0488 345/175 |
| 6,114,978 A | * | 9/2000 | Hoag .................... | G06F 3/0482 715/700 |

(Continued)

FOREIGN PATENT DOCUMENTS

| | | |
|---|---|---|
| KR | 10-2009-0025568 A | 3/2009 |
| KR | 10-2013-0016329 A | 2/2013 |

OTHER PUBLICATIONS

Communication dated Nov. 13, 2015, issued by the European Patent Office in counterpart European Patent Application No. 15161181.1.

*Primary Examiner* — Jeffrey A Gaffin
*Assistant Examiner* — Nhat Huy T Nguyen
(74) *Attorney, Agent, or Firm* — Sughrue Mion, PLLC

(57) ABSTRACT

A method of controlling a display apparatus for generating a symbol. The method includes displaying a plurality of images corresponding to a plurality of functions on a display, and in response to one of the plurality of images being selected by a user, determining a symbol corresponding to the selected image, matching a function corresponding to the selected image with the symbol, and storing the matched symbol with a correlation to the selected image.

15 Claims, 15 Drawing Sheets

(56) References Cited

U.S. PATENT DOCUMENTS

| | | |
|---|---|---|
| 8,458,615 B2 | 6/2013 | Chaudhri |
| 2002/0097229 A1 | 7/2002 | Rose et al. |
| 2002/0120653 A1* | 8/2002 | Kraft ................ G06F 17/30905 |
| | | 715/273 |
| 2014/0282127 A1* | 9/2014 | Muresan ............... G06F 3/0482 |
| | | 715/762 |
| 2014/0325281 A1* | 10/2014 | Yazaki ................ G06F 11/3664 |
| | | 714/38.1 |

* cited by examiner

100

DISPLAY APPARATUS FOR GENERATING SYMBOL AND METHOD THEREOF

CROSS-REFERENCE TO RELATED APPLICATIONS

This application claims priority from Korean Patent Application No. 10-2014-0047283, filed in the Korean Intellectual Property Office on Apr. 21, 2014, the disclosure of which is incorporated herein by reference.

BACKGROUND

1. Field

A method and an apparatus consistent with the exemplary embodiments relate to generating a symbol, and more particularly to analyzing a selected image and determining a symbol corresponding to the selected image in response to the image from a plurality of images corresponding to a plurality of functions, being selected on a display by a user.

2. Description of the Related Art

Recently, a television (TV) not only displays a TV program, but it also receives various types of information through data broadcasting and the Internet, and displays the information on a screen. Particularly, since the TV is connected to the Internet, a user is able to receive various contents from the Internet. The TV connected to the Internet receives information about news, and weather, etc. from a content provider, and displays the information on parts of the screen as a widget. As stated above, the user is able to check the latest news and weather easily since the received news and weather, etc. are continuously displayed on the parts of the TV screen as a widget.

In addition, the user is able to use the widget function displayed on the parts of the TV using a symbol command function.

However, the user is not able to access a widget which the user wants since the symbol command function has no correlation with a provided widget. Accordingly, there is a limit to control a function such as a widget of a display apparatus connected to the Internet using the existing symbol command function.

SUMMARY

Aspects of exemplary embodiments relate to a display apparatus, which in response to a user selection of a displayed image, which corresponds to a function, analyzes the selected image and automatically or manually generates a symbol corresponding to the selected image, and method thereof.

According to an aspect of an exemplary embodiment, a display method of generating a symbol includes displaying, on a display, a plurality of images corresponding to a plurality of functions, determining a symbol corresponding to an image from a plurality of images based on a selection of the image, matching a function corresponding to the selected image with the determined symbol and storing the matched symbol with a correlation to the selected image.

In this regard, the determining may include determining whether a pre-stored symbol corresponding to the determined symbol exists, and determining the determined symbol to be the matched symbol corresponding to the selected image based on the determining yielding that the pre-stored symbol corresponding to the determined symbol is not found.

In addition, the determining may include displaying a user interface (UI) for designating another symbol as the matched symbol that corresponds to the selected image based on the determining yielding that the pre-stored symbol corresponding to the determined symbol exists, and determining said another symbol, input using the UI, to be the matched symbol corresponding to the selected image.

Moreover, the determining may include displaying a list of a plurality of symbols based on the selection of the image, and displaying a user interface (UI) for designating a symbol corresponding to the selected image based on a selection of an icon from the plurality of symbols and determining the symbol, input using the UI, to be the matched symbol corresponding to the selected image.

Furthermore, the determining may include analyzing at least one of a first letter of text included in the image and an outline of the image and determining a symbol corresponding to the selected image.

The determining may include executing a function corresponding to a provided image based on the image being provided in response to a user selection of the symbol corresponding to the provided image.

The symbol may include at least one of a character, a number and a shape.

According to another aspect of an exemplary embodiment, a display apparatus for generating a symbol is provided. The display apparatus may include a user interface which receives a user manipulation, a display which displays a plurality of images, a storage which stores symbols corresponding to the plurality of images, and a controller which controls the display to display the plurality of images, determines a symbol corresponding to an image from the plurality of images based on the image being selected using the user interface, matches a function corresponding to the selected image with the symbol, and stores the matched symbol with a correlation to the selected image.

The controller may determine whether a pre-stored symbol corresponding to the determined symbol exists, and may further determine that the determined symbol is the matched symbol corresponding to the selected image based on the controller determining that the pre-stored symbol corresponding to the determined symbol is not found in the storage.

The controller may control the display to display another user interface (UI) for designating another symbol as the matched symbol that corresponds to the selected image based on the controller determining that the pre-stored symbol corresponding to the determined symbol exists in the storage, and may determine that the other symbol, input using the other UI, is the matched symbol corresponding to the selected image.sh Furthermore, the controller may control the display to display a list of a plurality of symbols based on a selection of one from among the plurality of images using the user interface, and control the display to display another user interface (UI) for designating a symbol corresponding to the selected image and is configured to determine that the symbol, input using the other UI, to be the matched symbol corresponding to the selected image.

The controller may analyze at least one of a first letter of a text included in the image and an outline of the image, and determine the symbol corresponding to the selected image.

The controller may execute a function corresponding to a provided image based on the user interface receiving user input of a symbol which corresponds to the provided image.

The symbol may include at least one of a character, a number, and a shape.

According to the above-described various exemplary embodiments, in response to a user selection of a displayed image corresponding to a function, the apparatus may analyze the selected image and automatically and/or manually generate a symbol corresponding to the selected image.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Hereinafter, exemplary embodiments will be described in detail with reference to the accompanying drawings.

Figure 1:
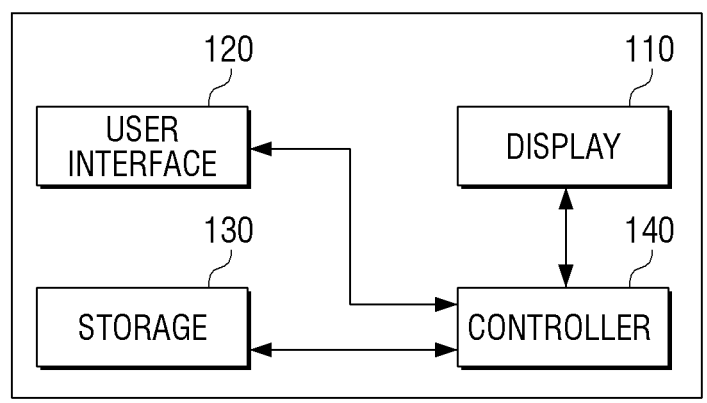
FIG. 1 is a block diagram illustrating a configuration of a display apparatus according to an exemplary embodiment.

FIG. 1 is a block diagram illustrating a configuration of a display apparatus 100 according to one exemplary embodiment. As described in FIG. 1, the display apparatus 100 includes a display 110, a user interface 120, storage 130, and a controller 140.

The display apparatus 100 may be a display apparatus such as a smart TV, but it is only an exemplary embodiment, and may be embodied as a desktop, a tablet personal computer (PC), or a smart phone, etc. As one exemplary embodiment, the display apparatus 100 may operate in association with a remote control apparatus and in response to one of a plurality of images displayed on the display 110 being selected by a user, the display apparatus 100 may analyze the selected image and generate a symbol corresponding to the image.

As one exemplary embodiment, the display 110 may display a user interface (UI) for designating another symbol as a symbol corresponding to the selected image by the user and a list of symbols including a plurality of symbols. At this point, the display 110 may be a touch screen.

The user interface 120 receives a manipulation from the user for running the display apparatus 100. The user interface 120 may be a button or a touch screen, etc. equipped on an exterior of the display apparatus 100. In addition, according to one exemplary embodiment, the manipulation of the user may be received through the remote control apparatus.

The storage 130 e.g., a memory, stores a program, data, and image data processed in an image processor for running the display apparatus 100. As one exemplary embodiment, a list of symbols including a plurality of symbols and a newly added symbol may be stored.

The controller 140 controls an overall motion of the display apparatus 100 according to the user's manipulation input using the user interface 120.

As one exemplary embodiment, the controller 140 may control the display 110 to display a plurality of images corresponding to a plurality of functions on the display 110. In response to one of the plurality of images being selected through the user interface 120, the controller 140 may analyze the selected image and determine a symbol corresponding to the image. Subsequently, the controller 140 may control the storage 130 to match a function corresponding to the selected image with a symbol and store the symbol matching the function corresponding to the selected image.

Specifically, the controller 140 may analyze at least one of a first letter of a text included in an image and an outline of the image, and may determine a symbol corresponding to the image. At this point, the symbol may include at least one of a character, a number, and a figure.

In addition, the controller 140 may determine whether a pre-stored symbol corresponding to the determined symbol exists. In response to determining that the pre-stored symbol corresponding to the determined symbol does not exist, the controller 140 may determine the determined symbol to be a symbol corresponding to an image.

In another exemplary embodiment, in response to finding a pre-stored symbol corresponding to the determined symbol, the controller 140 may control the display 110 to display the user interface (UI) for designating another symbol as a symbol corresponding to the image selected using the user interface 120. Subsequently, the controller 140 may determine the symbol input through the UI to be a symbol corresponding to an image.

Furthermore, in response to one of a plurality of images being selected through the user interface 120, the controller 140 may control the display 110 to display a list of symbols including a plurality of symbols. After that, the controller 140 may determine the symbol input using the UI to be a symbol corresponding to the selected image.

Moreover, in response to a user command to draw a symbol corresponding to an image being input through the user interface 120, the controller 140 may execute a function corresponding to the drawn symbol.

Hereinafter, the display apparatus 100 according to various exemplary embodiments will be explained with reference to FIGS. 2 to 8.

Figure 2:
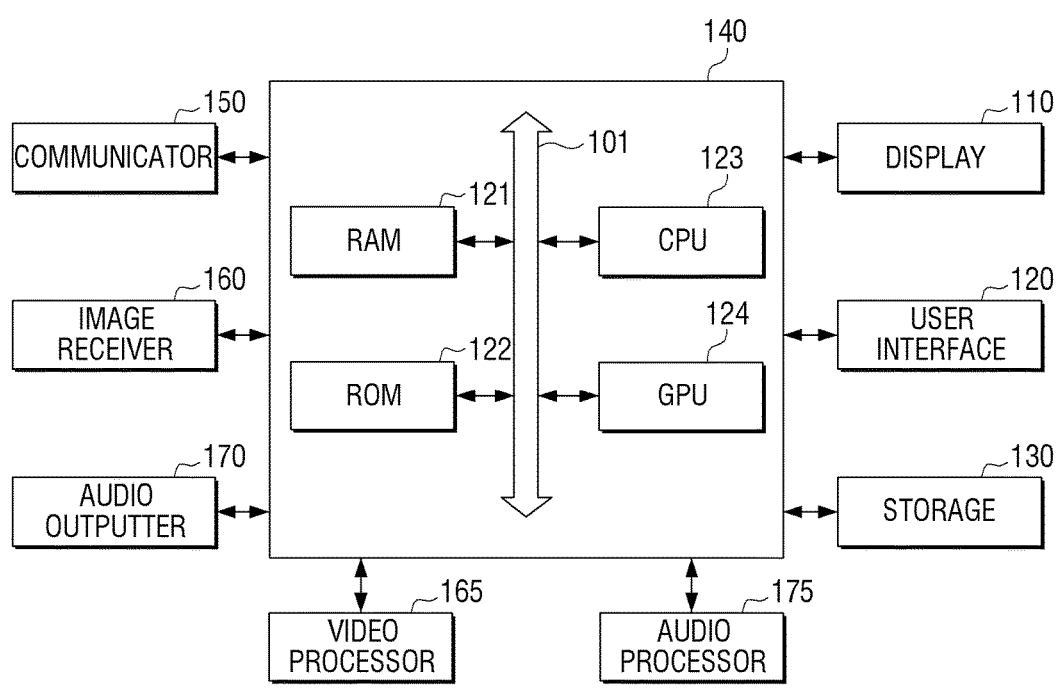
FIG. 2 is a detailed block diagram illustrating a configuration of a display apparatus according to an exemplary embodiment.

FIG. 2 is a detailed block diagram illustrating a configuration of the display apparatus 100 according to one exemplary embodiment. As described in FIG. 2, the display apparatus 100 includes the display 110, the user interface 120, the storage 130, the controller 140, a communicator 150, an image receiver 160, a video processor 165, an audio outputter 170, and au audio processor 175.

However, FIG. 2 illustrates all types of elements synthetically with an example in which the display 100 is an apparatus equipped with various functions such as communicating, broadcast receiving, video playing, and displaying, etc. Therefore, according to the exemplary embodiment, a part of the elements illustrated in FIG. 2 may be omitted or changed, and another element of the configuration may be added.

The display 110 displays image data and various types of user interfaces (UI) according to a control by the controller 140. Particularly, the display 110 may display the user interface (UI) for designating a plurality of images, a list of symbols including a plurality of symbols, and a symbol corresponding to a plurality of functions. At this point, in response to the display 110 being embodied as a touch screen, a user command may be input through the touch screen.

The user interface 120 receives a user command for running the display apparatus 100. At this point, the user interface 120 may be embodied as a button and a touch screen, etc. equipped on the exterior of the display apparatus 100.

In addition, the user command may be input through the user interface 120 equipped in the display apparatus 100. However, in response to a user command being input through a remote control apparatus operating in association with the display apparatus 100, the display apparatus 100 may receive the user command through the communicator 150 of the display apparatus 100.

As an exemplary embodiment, the user may select an image from a plurality of images displayed on the display 110. In addition, in response to the user interface (UI) for designating another symbol as a symbol corresponding to the selected image by the user being displayed, the user may input a new symbol through the user interface 120.

The storage 130 stores a program, data, and image data processed in the image processor for running the display apparatus 100. In an exemplary embodiment, a list of symbols including a plurality of symbols and a newly added symbol may be stored. Hereinafter, this will be explained in detail.

The communicator 150 is configured to communicate with various types of external devices or external servers according to various ways of communication. The communicator 150 may include various kinds of communication chips such as a WiFi chip, a Bluetooth chip, a near field communication (NFC) chip, and a wireless chip, etc. At this point, the WiFi chip, the Bluetooth chip, and the NFC chip communicate in WiFi, Bluetooth, and NFC manners, respectively. Among those chips, the NFC chip refers to a chip working in the NFC manner which uses a band of 13.56 MHz among various RF-ID frequency bands such as 135 kHz, 13.56 MHz, 433 MHz, 860~960 MHz, and 2.45 GHz. The WiFi chip or the Bluetooth chip may first transmit or receive various kinds of connection information such as sub system identification (SSID) and a session key for communication and receive various kinds of information. The wireless communication chip refers to a chip performing communication according to various types of communication standards such as Institute of Electrical and Electronics Engineers (IEEE), Zigbee, 3G (3rd Generation), 3GPP (3rd Generation Partnership Project), and LTE (Long Term Evolution).

Figure 3A:
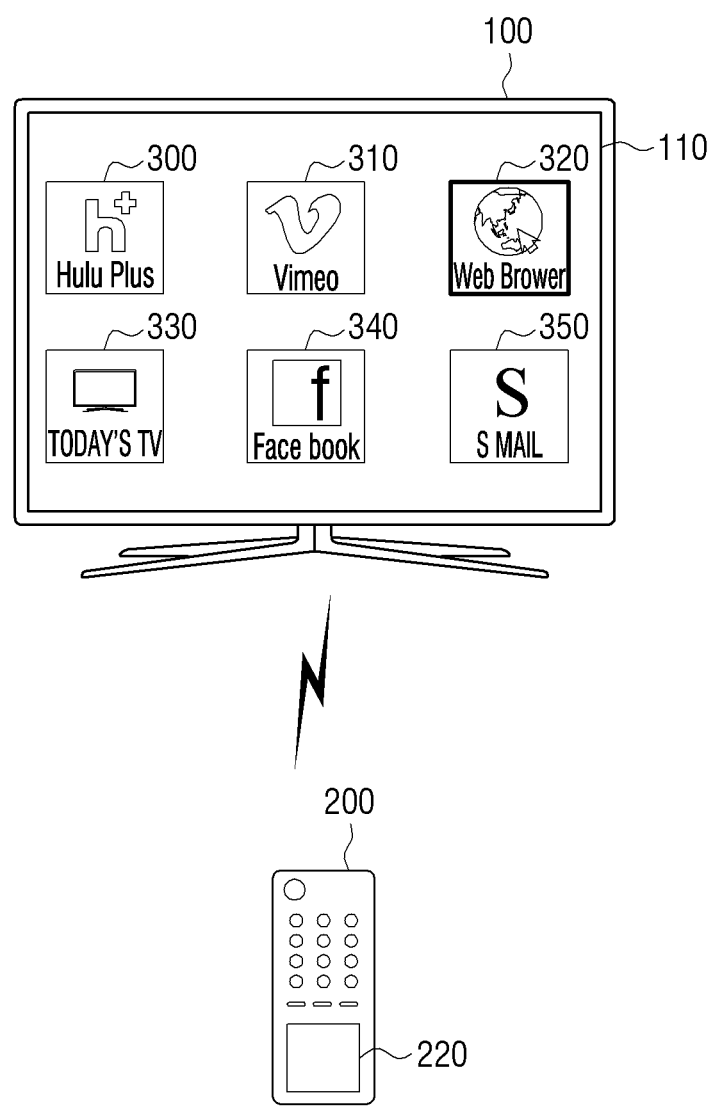
FIGS. 3A to 4C are views illustrating a motion of a display apparatus for automatically generating a symbol according to an exemplary embodiment.

In an exemplary embodiment, in response to a user command being input through a remote control apparatus, the communicator 150 may receive user input information from the remote control apparatus 200, shown in FIG. 3A.

The image receiver 160 receives content through various types of external sources. Specifically, the image receiver 160 may receive a broadcasting content from an external broadcasting station, receive an image content from an external apparatus (for example, a digital video disc (DVD)), and receive a streaming content from an external server. The received content and related various icons may be displayed through the display 110.

The video processor 165 processes image data received from the image receiver 160 to be displayable data. The video processor 165 may perform various types of image processing on the image data such as decoding, scaling, noise filtering, frame-rate converting, and resolution converting, etc.

The audio outputter 170 outputs audio data of the image content. The audio processor 175 is configured to output not only all types of audio data but also all types of notification sounds and voice messages.

The audio processor 175 is an element configured to perform processing on audio data. The audio processor 175 may perform various types of processing on the audio data such as decoding, amplifying, and noise filtering, etc. The audio data processed in the audio processor 175 may be output through the audio outputter 170.

The controller 140 receives a user command through the user interface 120 and controls overall motions of the display apparatus 100.

As illustrated in FIG. 2, the controller 140 includes a random access memory (RAM) 121, a read only memory (ROM) 122, a main central processing unit (CPU) 123, a graphic processing unit (GPU) 124, and a bus 101. In this regard, the RAM 121, the ROM 122, the main CPU 123, and the GPU 124 may be connected with each other through the bus 101.

The RAM 121 stores a set of commands for booting a system. In response to the display apparatus 100 being provided with a power-on command and being supplied with power, the main CPU 123 copies an operating system (O/S) stored in a storage (not shown) onto the RAM 121 according to a command stored in the ROM 122, and boots a system by executing the O/S.

The GPU 124 generates a screen which includes various objects such as an icon, an image, text, and a content, etc. using an operation part (not shown) and a rendering part (not shown).

The main CPU 123 performs a booting by accessing a storage (not shown), and using the O/S stored in the storage. In addition, the main CPU 123 performs various types of motions using all kinds of programs, contents, data, and related icons stored in the storage.

Particularly, the controller 140 may receive a user command through the user interface 120 and control the display apparatus 100.

Figure 3B:
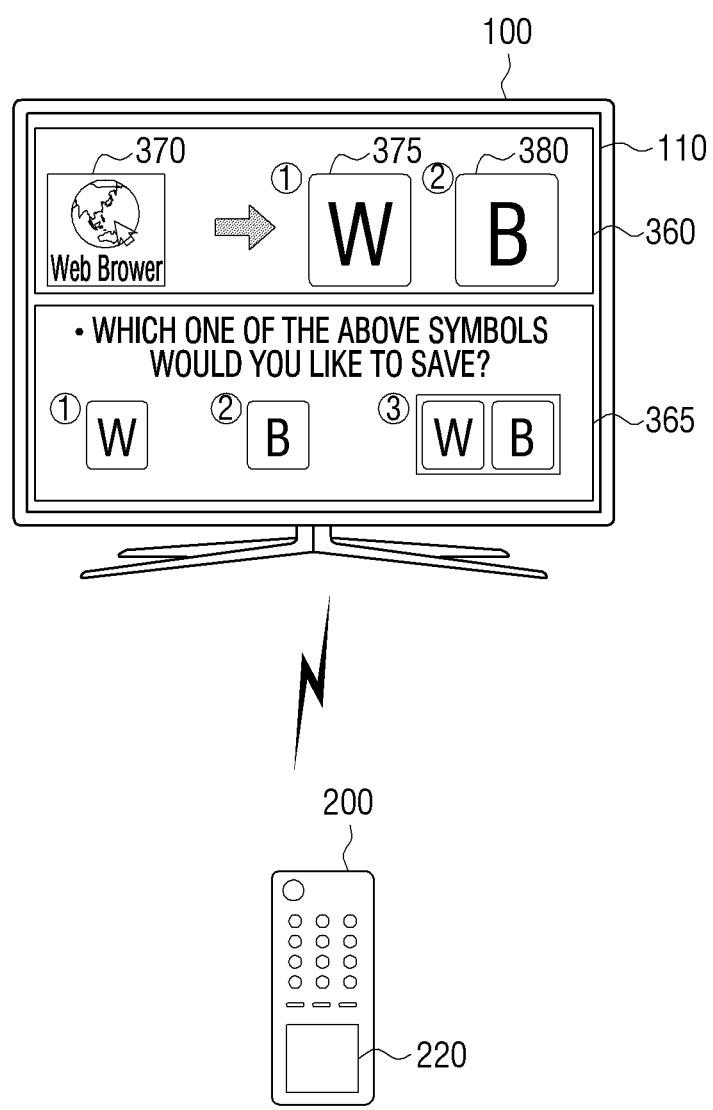

Specifically, the controller 140 may control the display 110 to display a plurality of images corresponding to a plurality of functions on the display 110. In response to one of the plurality of images being selected through the user interface 120, the controller 140 may analyze the selected image and determine a symbol corresponding to the image. Subsequently, the controller 140 may control the storage 130 to match a function corresponding to the selected image with a symbol and store the symbol matching the function corresponding to the selected image. For instance, as shown in FIGS. 3A to 3B, the controller 140 may control the display 110 to display a plurality of images 300 to 350 corresponding to a plurality of functions on the display 110. In response to an image 320 being selected from the plurality of images 300 to 350 using the remote control apparatus 200 which includes the touch pad 220, the controller 140 may analyze the selected image 370 of a Web Brower and determine symbols 375 and 380 corresponding to the image 370 of the Web Brower. In this regard, the controller 140 may control the display 110 to display window 360 which includes determined symbols W 375 and B 380 corresponding to the image 370 of the Web Brower. Subsequently, the controller 140 may control the display 110 to display the symbols 375 and 380 corresponding to the image 370 of the Web Brower, and at the same time, to display a window 365 which shows a phrase 'which one of the symbols would you like to save?' and symbols W, B, and WB which can be selected by the user.

Figure 4A:
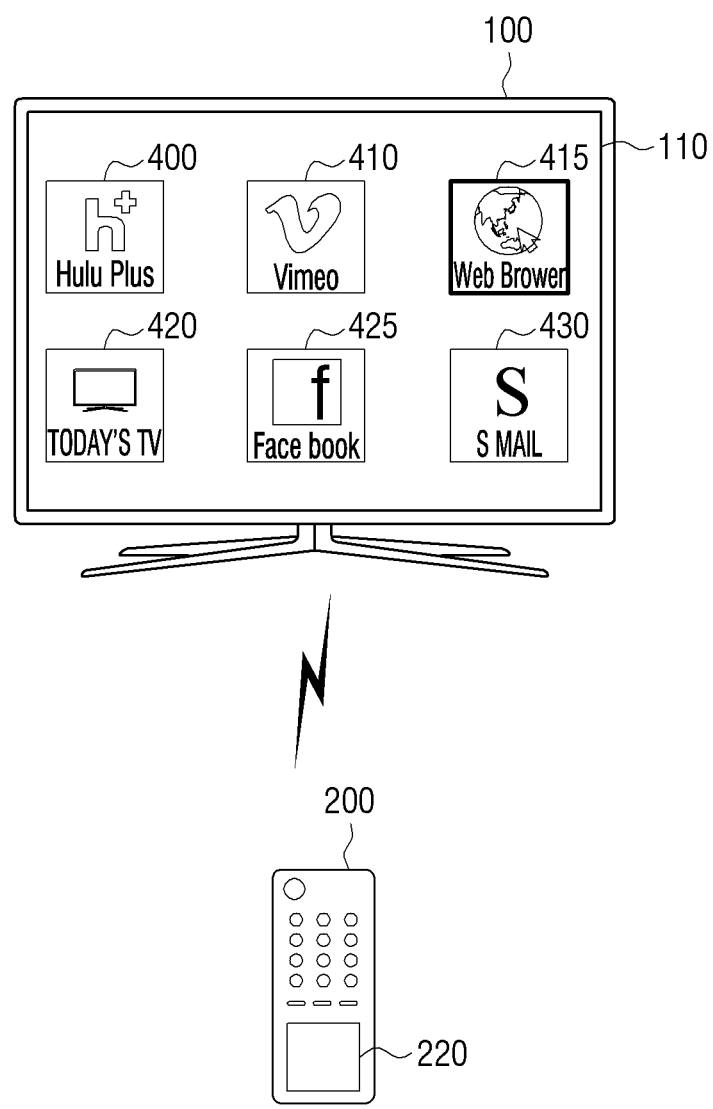
Figure 4B:
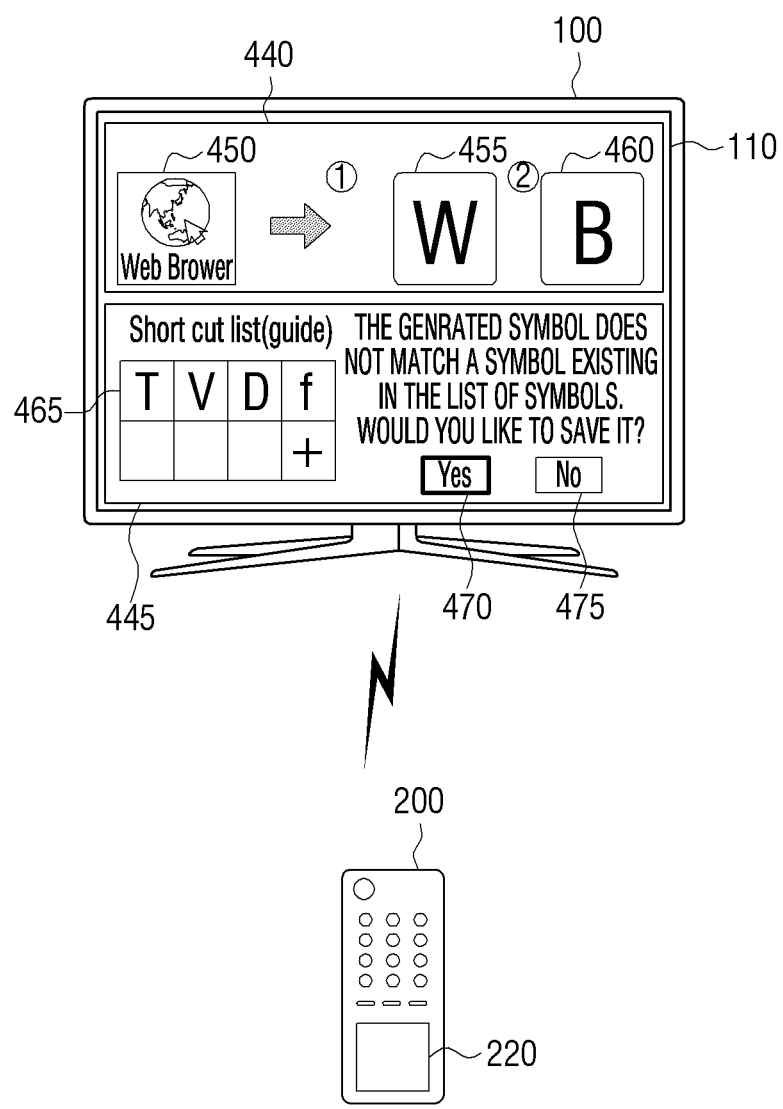
Figure 4C:
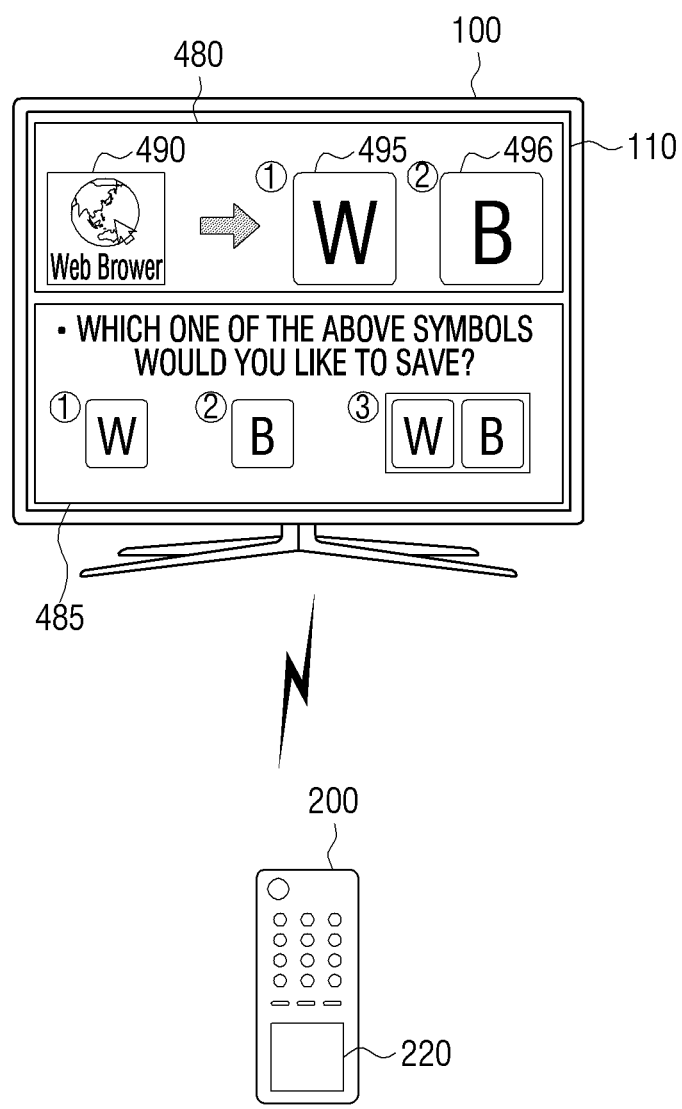

In an exemplary embodiment, the controller 140 may determine whether a pre-stored symbol corresponding to the determined symbol exists. In response to determining that the pre-stored symbol corresponding to the determined symbol does not exist, the controller 140 may determine the determined symbol to be a symbol corresponding to an image. For example, as illustrated in FIG. 4A, the controller 140 may control the display 110 to display a plurality of images 400 to 430 corresponding to a plurality of functions on the display apparatus 100. As shown in FIG. 4B, in response to a user selecting an image 415 from among the plurality of images 400 to 430, the controller 140 may analyze the selected image 450 of the Web Brower, and may determine symbols 455 and 460 corresponding to the image 450 of the Web Brower. The controller 140 may control the display 110 to display a window 440 which shows the determined symbols W 455 and B 460 corresponding to the image 415 or 450 of the Web Brower. The controller 140 may determine whether the determined symbols W 455 and B 460 exist in a list of pre-stored symbols 465. In response to a symbol corresponding to the determined symbols W 455 and B 460 not existing in the list of pre-stored symbols 465 shown in the window 445, the controller 140 may determine the determined symbols W 455 and B 460 to be symbols corresponding to the image 450 of the Web Brower. The controller 140 may also control the display 110 to display the list of pre-stored symbols 465 in a window 445 with a phrase 'the generated symbol does not match a symbol existing in the list of symbols. Would you like to save it?'. Subsequently, as shown in FIG. 4C, the controller 140 may control the display 110 to display a window 480 with the symbols 495 and 496 corresponding to the image 490 of the Web Brower, and at the same time, to display, in a window 485, a phrase 'which one of the above symbols would you like to save?'. In addition, the controller 140 may control the display 110 to display in the window 385 the symbols W, B, and WB which can be selected by the user.

Figure 5A:
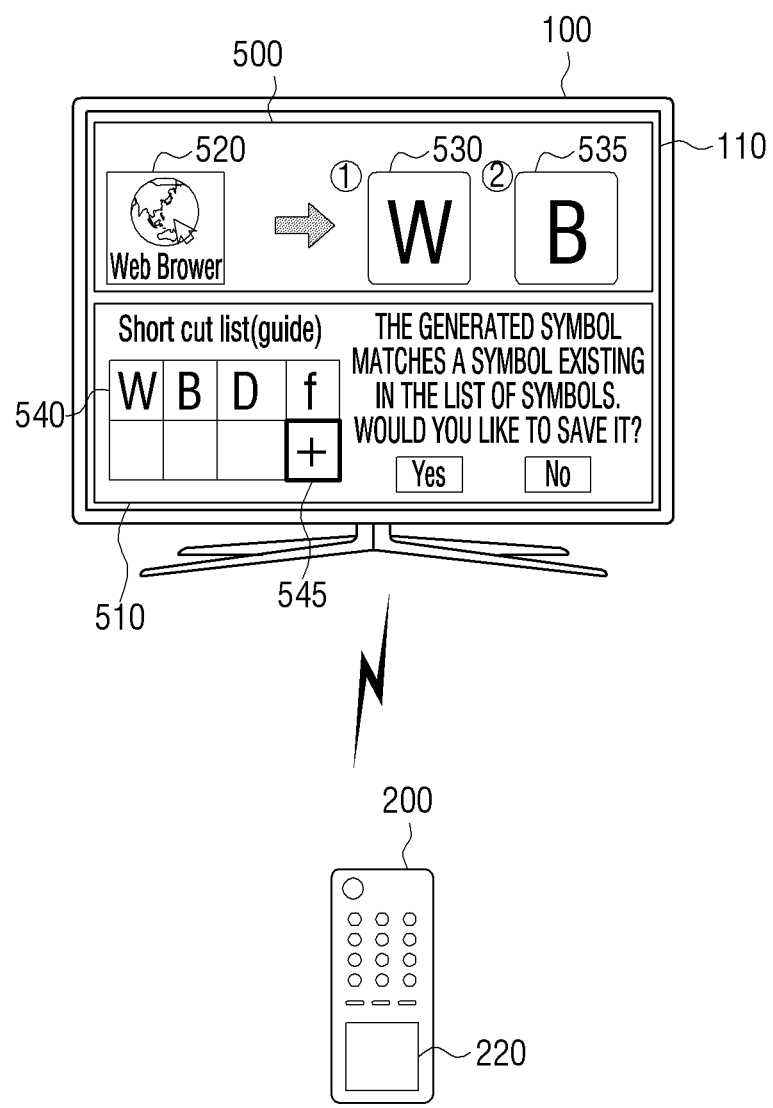
FIGS. 5A to 6C are views illustrating a motion of a display apparatus for manually generating a symbol according to an exemplary embodiment.
Figure 5B:
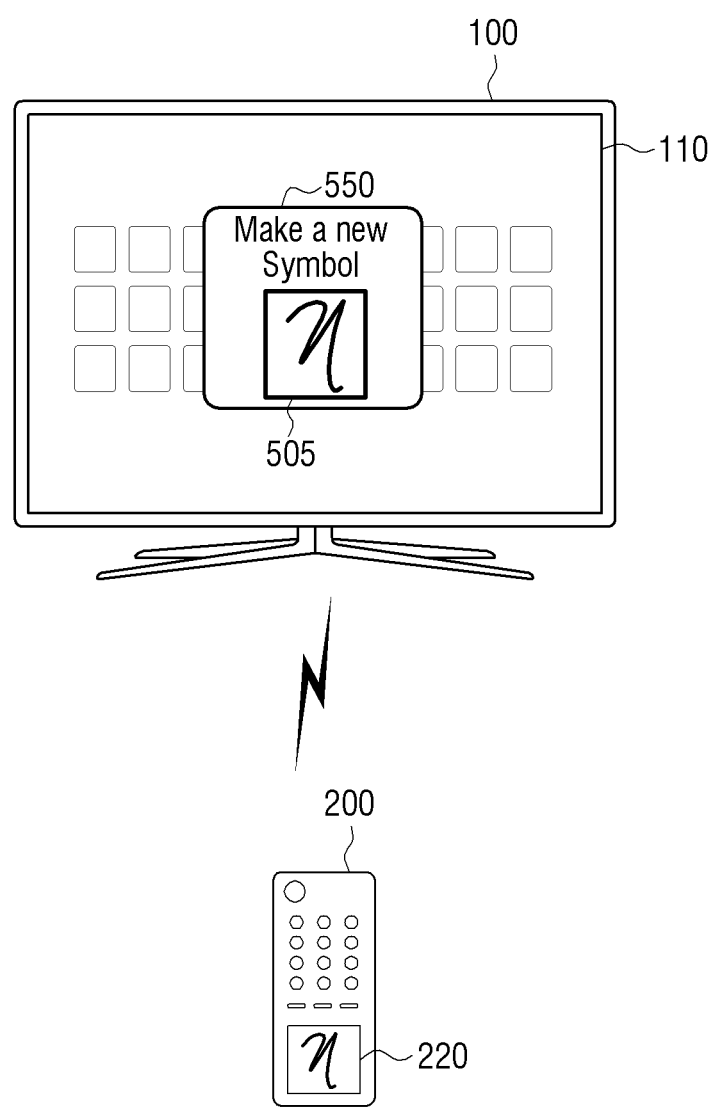

In yet another exemplary embodiment, in response to determining that the pre-stored symbol corresponding to the determined symbol exists, the controller 140 may control the display 110 to display the user interface (UI) for designating another symbol as a symbol corresponding to the image selected through the user interface 120. In addition, the controller 140 may determine that the symbol input using the UI to be a symbol corresponding to the selected image. Specifically, as illustrated in FIG. 5A, the controller 140 may control the display 110 to display a window 500 which shows the determined symbols W 530 and B 535 corresponding to the image 520 of the Web Brower selected by the user. The controller 140 may determine whether the determined symbols W 530 and B 535 exist in a list of pre-stored symbols 540. In response to determining that a symbol corresponding to the determined symbols W 530 and B 535 exist in the list of pre-stored symbols 540, the controller 140 may control the display 110 to display a user interface (UI) indicating whether the determined symbols W 530 and B 535 are stored or not. For example, the controller 140 may control the display 110 to display a phrase 'the generated symbol matches a symbol existing in the list of symbols. Would you like to save it?'. In response to the user selecting to add the determined symbols W 530 and B 535 to the list of symbols 540 in which these symbols are already saved as the pre-stored symbols, the user may select YES, and in response to the user not wanting to add the determined symbols W 530 and B 535 to the list of symbols 540 in which these symbols are already save as the pre-stored symbols, the user may select NO. Moreover, as shown in FIG. 5B, in response to the user selecting an icon + 545 for adding a symbol existing in the list of symbols 540, the controller 140 may determine that the user wants to designate another symbol, and may control the display 110 to display a user interface (UI) 550, shown in FIG. 5B, for designating another symbol. The controller 140 may determine the symbol input by the user using the touch pad 220 of the remote control apparatus 200 to be a symbol 505 corresponding to the Web Brower.

Figure 6A:
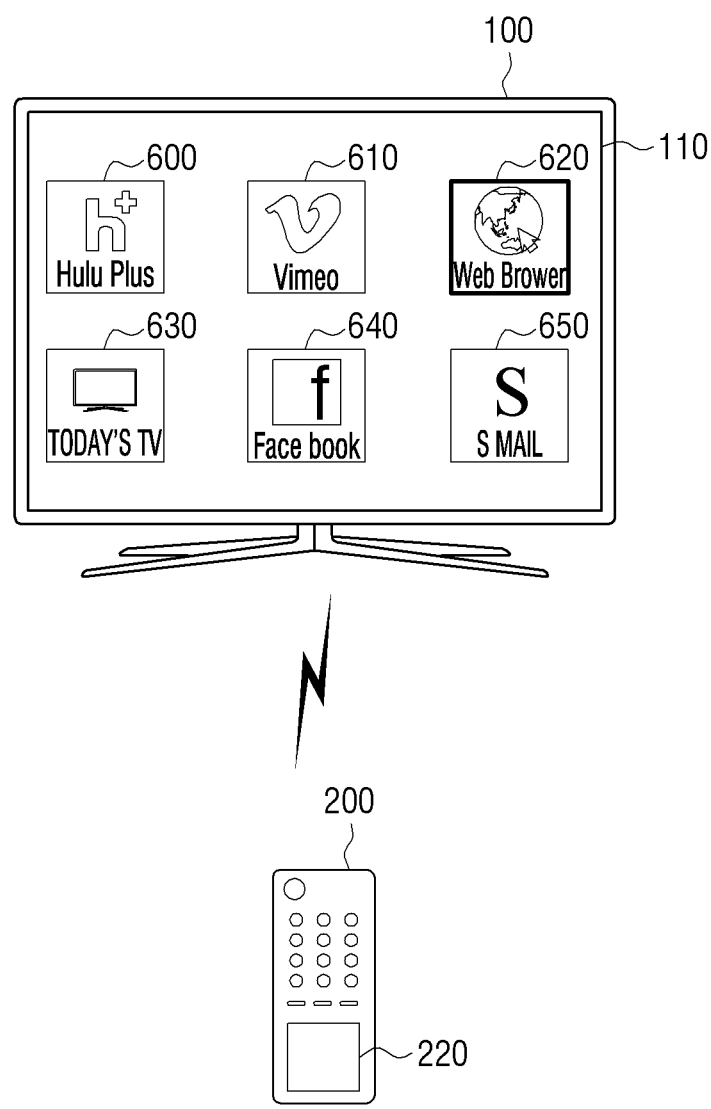
Figure 6B:
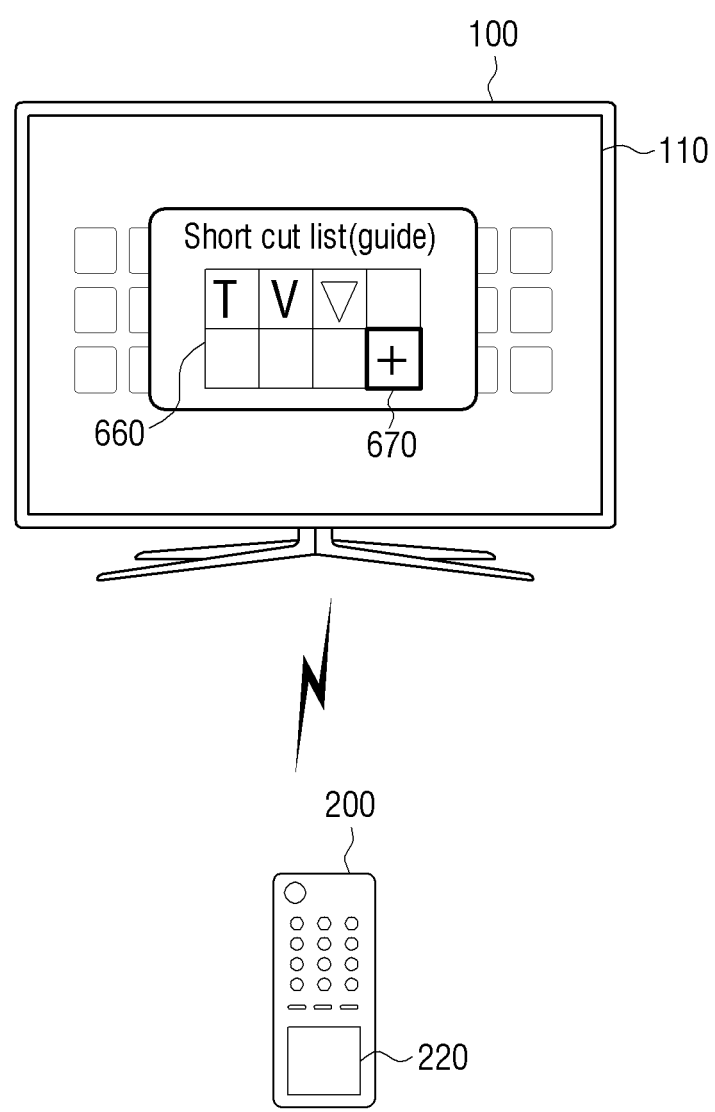

In another exemplary embodiment, as shown in FIG. 6A, in response to one image 620 of a plurality of images 600-650 being selected using the user interface 120, the controller 140 may control the display 110 to display a list of symbols 660, shown in FIG. 6B, including a plurality of symbols. In response to an additional icon 670 included in the list of symbols 660 being selected, the controller 140 may control the display 110 to display a user interface (UI) for designating a symbol corresponding to the selected image 620. Subsequently, the controller 140 may determine the symbol input using the UI to be a symbol corresponding to the selected image.

Figure 6C:
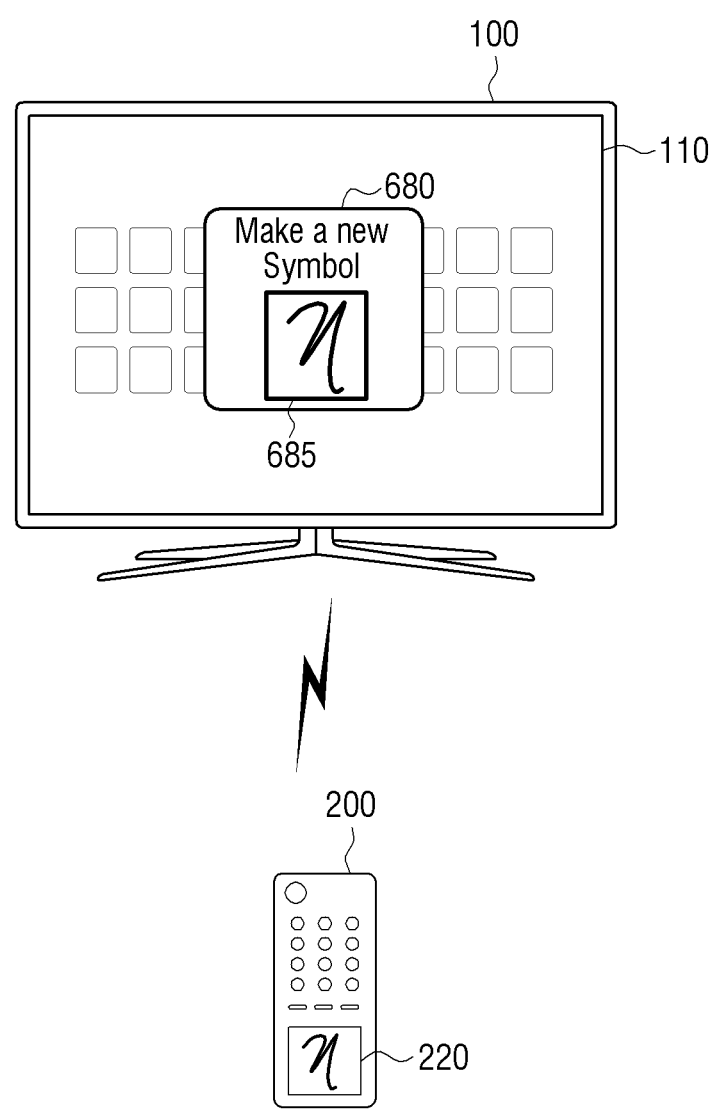

Specifically, as shown in FIGS. 6A to 6C, the controller 140 may control the display 110 to display the plurality of images 600 to 650 corresponding to a plurality of functions on the display 110. In response to one image 620 of the plurality of images 600 to 650 being selected using the remote control apparatus 200 including the touch pad 220, the controller 140 may control the display 110 to display the list of symbols 660 which includes a plurality of symbols. Subsequently, in response to an icon 670 for adding a symbol included in the list of symbols 660 being selected, the controller 140 may control the display 110 to display a user interface (UI) 680, shown in FIG. 6C, for designating a symbol corresponding to an image of the Web Brower 620. The user may determine the symbol input using the touch pad 220 of the remote control apparatus 200 to be a symbol 685 corresponding to the Web Brower.

According to the above-described exemplary embodiment, the display apparatus 100 analyzes an image selected by the user, determines a symbol corresponding to the image, matches a function corresponding to the selected image with a symbol, and stores the symbol that matches the function corresponding to the image. In an exemplary embodiment, these operations of analyzing, determining, and storing may be displayed using the user interface (UI). However, this is provided by way of an example and not by way of a limitation. Analyzing the image selected by the user, determining a symbol corresponding to the image, and storing the symbol, may not be displayed using the UI.

Figure 7:
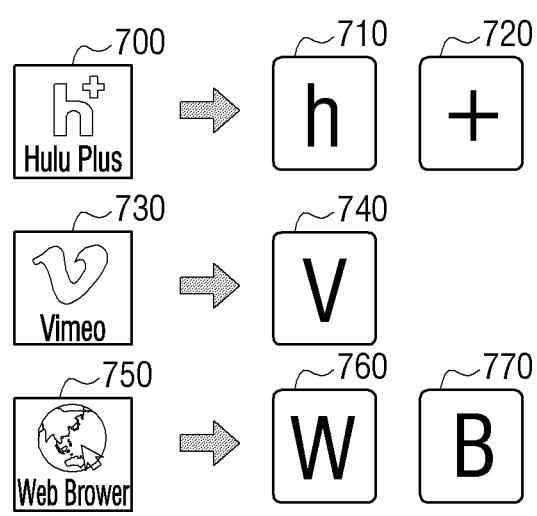
FIG. 7 is a view illustrating an automatic generation of a symbol according to an exemplary embodiment.

In an exemplary embodiment, the controller 140 may analyze at least one of a first letter of a text included in an image and an outline of the image, and may determine a symbol corresponding to the image. Specifically, as shown in FIG. 7, in response to a plurality of images 700, 730, and 750 corresponding to a plurality of functions being displayed on the display 110, the controller 140 may analyze a first letter of the text and an outline of an image of Hulu Plus. The controller 140 may then generate a symbol H corresponding to the first letter and the outline of the image of Hulu Plus, which is also H as another symbol, or may generate + corresponding to the outline of the image of Hulu Plus as yet another symbol. In addition, the controller 140 may analyze a first letter of text and an outline of an image of Vimeo, and generate V corresponding to the first letter of the text and the outline of the image of Vimeo as a symbol.

As for the image of a Web Brower, the controller may analyze the first letter of the text and generate W and B as symbols.

As described above, according to an exemplary embodiment, a symbol may be generated including at least one of a character (V, W, and B of FIG. 7), a number, and a figure (+ of FIG. 7).

Figure 8:
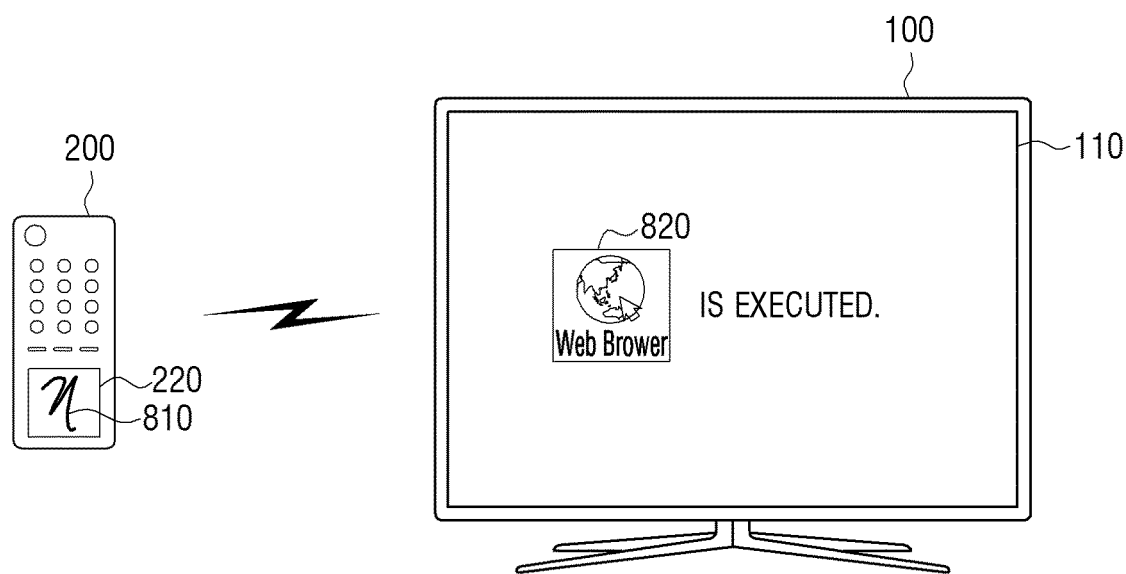
FIG. 8 is a view illustrating a function of a symbol according to an exemplary embodiment.

FIG. 8 is a view illustrating a function of a symbol according to an exemplary embodiment.

In an exemplary embodiment, in response to the user command being input which requests to draw an image corresponding to a symbol using the user interface 120, the controller 140 may execute a function corresponding to the drawn symbol. Specifically, as shown in FIG. 8, in response to a symbol 810 being input by the user using the touch pad 220 of the remote control apparatus 200, the controller 140 of the display apparatus 100 may execute a function of the Web Brower 820, which corresponds to the symbol 810.

Figure 9:
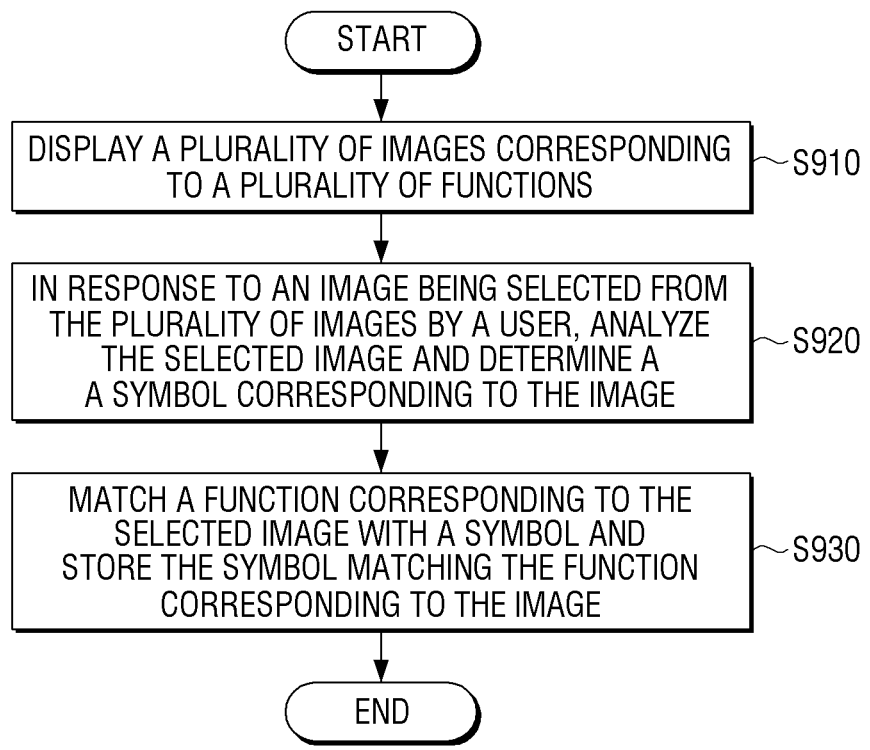
FIG. 9 is a flowchart illustrating a method of generating a symbol of a display apparatus according to an exemplary embodiment.

FIG. 9 is a flowchart illustrating a method of generating a symbol of a display apparatus according to an exemplary embodiment.

The display apparatus 100 displays a plurality of images corresponding to a plurality of functions on a display (in operation S910). In response to one of the plurality of images being selected by the user, the display apparatus 100 analyzes the selected image and determines a symbol corresponding to the image (in operation S920). For example, as shown in FIG. 3, the display apparatus 100 may control the display 110 to display the plurality of images 300 to 350 corresponding to a plurality of functions on the display 110. In response to an image 320 of the plurality of images 300 to 350 being selected using the remote control apparatus 200 including the touch pad 220, the display apparatus 100 may analyze the selected image 320 of the Web Brower and may determine that symbols 375 and 380 correspond to the image 370 of the Web Brower.

Furthermore, the display apparatus 100 matches a function corresponding to the selected image with a symbol and stores the symbol matching the function corresponding to the selected image (in operation S930).

A program code for performing the method of controlling the display apparatus according to various exemplary embodiments as described above may be stored in a non-transitory computer readable medium. The non-transitory computer readable medium does not refer to a medium storing data for a short moment such as a register or a cache, but refers to a medium which is capable of storing data semi-permanently and reading the data by an apparatus. Specifically, the above-described various applications or programs may be stored in the non-transitory computer readable medium such as a compact disc (CD), a digital versatile disk (DVD), a hard disk, a Blu-ray disk, a universal serial bus (USB), a memory card, and a read only memory (ROM).

The foregoing exemplary embodiments are merely exemplary and are not to be construed as limiting. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art. One of ordinary skill in the art would readily appreciate that all exemplary embodiments and modifications conceived from the meaning and scope of the claims and their equivalents are included in the scope of the present disclosure.

What is claimed is:

1. A method for executing a function of an icon by inputting a symbol, comprising:
   displaying a plurality of icons corresponding to a plurality of functions on a display;
   analyzing, by a controller, an image corresponding to an icon of the plurality of icons to extract an outline of a graphic object included in the image and at least one letter of a text included in the image;
   generating at least two symbols for the icon based on the analyzed image on the display comprising the extracted at least one letter of the text included in the image and the extracted outline of the graphic object included in the image;
   in response to a symbol of the at least two generated symbols being selected by a user, matching the selected symbol to a function represented by the icon; and
   in response to a user input which draws an image of the selected symbol using a user interface, executing the function.

2. The method as claimed in claim 1, wherein the generating comprises:
   determining whether a pre-stored symbol corresponding to the image exists; and
   determining that the symbol is to be the matched symbol corresponding to the image based on the determining yielding that the pre-stored symbol corresponding to the selected symbol is not found.

3. The method as claimed in claim 2, wherein the generating comprises:
   displaying a user interface (UI) for designating another symbol as the matched symbol that corresponds to the image based on the determining yielding that the pre-stored symbol corresponding to the selected symbol exists; and
   determining said another symbol, input using the UI, to be the matched symbol corresponding to the image.

4. The method as claimed in claim 1, wherein the matching comprises:
   displaying a list of a plurality of symbols based on the analyzing of the image;
   displaying a user interface (UI) for designating the symbol corresponding to the image based on a selection of the icon from the plurality of icons; and
   matching the symbol, input using the UI, to be the matched symbol corresponding to the image.

5. The method as claimed in claim 1, wherein the symbol comprises at least one of a character, a number, and a shape.

6. The method as claimed in claim 1, wherein in response to the selected symbol being matched to another icon from the plurality of icons, matching another symbol selected from a list of a plurality of symbols with the image.

7. The method as claimed in claim 1, wherein the plurality of icons are widgets that correspond to the plurality of functions, which are executable upon selection of a respective icon.

8. The method as claimed in claim 1, wherein the matching further comprises: displaying the at least two generated symbols to be matched up with the image corresponding to the icon and selecting one of the generated respective symbols to be the matched symbol based on user input.

9. The method as claimed in claim 1, further comprising:
   receiving, from a remote controller, a user selection of the displayed image from among plurality of images and analyzing the received image;

receiving from the remote controller the matched symbol being drawn by a user; and displaying broadcasting content.

10. The method as claimed in claim 1, wherein the matching comprises matching the plurality of functions to the symbol corresponding to at least two of the plurality of icons comprising the icon.

11. A display apparatus for generating a symbol, comprising:
an input interface configured to receive user input;
a display configured to display a plurality of icons corresponding to a plurality of functions; and
a controller configured to analyze an image corresponding to an icon of the plurality of icons to extract an outline of a graphic object included in the image and at least one letter of a text included in the image, generating at least two symbols for the icon based on the analyzed image on the display comprising the extracted at least one letter of the text included in the image and the extracted outline of the graphic object included in the image, in response to a symbol of the at least two generated symbols being selected by a user, matching the selected symbol to a function represented by the icon, and in response to the input interface receiving the user input which draws an image of the selected symbol, executing the function.

12. The apparatus as claimed in claim 11, wherein the controller is further configured to determine whether a pre-stored symbol corresponding to the image exists, and is further configured to determine that the symbol is the matched symbol corresponding to the image based on the controller determining that the pre-stored symbol corresponding to the selected symbol is not found.

13. The apparatus as claimed in claim 12, wherein the controller is further configured to control the display to display a user interface (UI) for designating another symbol as the matched symbol that corresponds to the image based on the controller determining that the pre-stored symbol corresponding to the selected symbol exists, and the controller is further configured to determine said another symbol, input using said UI, to be the matched symbol corresponding to the image.

14. The apparatus as claimed in claim 11, wherein the controller is configured to control the display to display a list of a plurality of symbols based on a selection of the image using the display, and a user interface (UI) for designating a symbol corresponding to the image based on a user selection, using the input interface, of the icon, and determines the symbol, input using said UI, to be the matched symbol corresponding to the image.

15. The apparatus as claimed in claim 11, wherein the symbol includes at least one of a character, a number, and a shape.

* * * * *